United States Patent
Stoner et al.

[11] Patent Number: 5,890,397
[45] Date of Patent: Apr. 6, 1999

[54] FOUR-WAY ADJUSTABLE PEDESTAL FLOOR MOUNTED STEERING COLUMN FOR A COMBINE HARVESTER

[75] Inventors: Kurt B. Stoner, Seven Valleys; David B. Stauffer, New Holland; Pedro C. Abreu, New Holland, all of Pa.

[73] Assignee: New Holland North America, Inc., New Holland, Pa.

[21] Appl. No.: 803,793

[22] Filed: Feb. 24, 1997

[51] Int. Cl.⁶ .................................................. B62D 1/18
[52] U.S. Cl. ............................ 74/493; 74/531; 280/775
[58] Field of Search ...................... 74/493, 531; 280/775

[56] References Cited

U.S. PATENT DOCUMENTS

| | | | |
|---|---|---|---|
| 3,198,030 | 8/1965 | Miller et al. | 74/493 |
| 4,733,745 | 3/1988 | Lumpkins | 180/315 |
| 4,972,732 | 11/1990 | Venable et al. | 74/493 |
| 4,993,279 | 2/1991 | Doescher et al. | 74/493 |
| 5,035,446 | 7/1991 | Arvidsson | 280/775 |
| 5,088,342 | 2/1992 | Bening et al. | 74/493 |
| 5,168,768 | 12/1992 | Easton | 74/493 |
| 5,226,853 | 7/1993 | Courgeon | 74/493 X |
| 5,503,431 | 4/1996 | Yamamoto | 74/493 X |

*Primary Examiner*—Allan D. Herrman
*Attorney, Agent, or Firm*—J. William Stader; Larry W. Miller; Frank A. Seemar

[57] ABSTRACT

The disclosure relates to a steering column which is capable of moving four ways. The steering column has a base support affixed to a horizontal cab floor. The base support has a steering motor. The steering column has an input shaft with a upper telescoping shaft. Attached to the upper telescoping shaft is the steering wheel. Also attached to the upper telescoping shaft is the upper input shaft. The first universal joint connects the upper input shaft to the inner input shaft. Torque is transferred by a key on the exterior circumference of the inner input shaft to a key slot on the interior circumference of the outer input shaft. The outer input shaft is connected to the lower input shaft by the second universal joint. The lower input shaft is connected to the steering motor. Attached to the base support is the lower pivot assembly. The lower pivot assembly rotates about the base support by actuating a lower gas cylinder. The lower pivot assembly can translate by operating the lower locking knob. The upper pivot assembly is attached to the lower pivot assembly. The upper pivot assembly can pivot by actuating an upper gas cylinder.

20 Claims, 10 Drawing Sheets

FOUR-WAY ADJUSTABLE PEDESTAL FLOOR MOUNTED STEERING COLUMN FOR A COMBINE HARVESTER

BACKGROUND OF INVENTION

1. Field of Art

This invention relates to the improvement of a steering column in the cab of an agricultural combine harvester. More specifically it relates to a steering column which may be adjusted in four directions.

2. Description of Prior Art

Mechanical harvesting of grain has taken place for decades. However, efforts continue in the attempt to make harvesting operations more efficient and effective. A combine harvester generally includes a head which cuts the crop. The head than moves the cut crop into a feeder house. The feeder house lifts the cut crop into the threshing and separation areas of the combine. The grain is separated from the stalk by a rotor. The grain is then moved and stored in a grain tank. The chaff and trash is deposited from the rear of the combine. An operator usually runs these various operations from a glass-enclosed cab. Typically, a cab is located behind the head and in front of the threshing and separation areas of the combine. An operator can observe most of the combine activities from the cab. During harvesting periods it is not uncommon for the combine to be operated for an extended time. Sometimes a single operator will use a combine for 16 to 18 hours a day. Furthermore, several operators may alternate in the use of the combine. Therefore is it necessary to provide a cab which will allow maximum operator comfort and flexibility. This will permit the operator to remain mentally alert for the long time intervals needed to harvest crops. One aspect of maintaining the operator's alertness is to provide a steering column that may be manipulated to a comfortable position. Equally important is to provide a steering column which is located in a manner to allow an unobstructed view of the various combine operations. It would also be advantageous to provide a steering column which would be suitable to different sized individuals. Finally it would be desirable to provide an steering column that is relatively impervious to the harsh off-road environment common in farming operations.

The effort to design and manufacture an acceptable steering column for farm operations is considerable. The research effort has followed several paths. Many steering columns use a single telescoping portion. This feature allows the steering wheel to be moved either closer or further from the operator. An additional improvement provides for a pivot assembly to allow the column to be positioned in a variety of angles. Initially, a ratchet mechanism has been used to control the pivoting motion. Later, gas cylinders were introduced to allow the steering column to be positioned in infinite range of angles. However, each of these approaches has limitations and drawbacks. Typically, these steering columns were placed in automobiles into a vertical wall, such as the firewall. Therefore, it is necessary to provide only a steering column with two ranges of motion (rotation around the pivot axis and translation along the steering column). However, in a harvester combine such a design is undesirable. The placement of a steering column on a vertical surface would obstruct the operator's view of the header. It is possible to affix a steering column to the horizontal cab floor. However, it is difficult for operators of different sizes to position the steering column in manner which is both comfortable and which does not obstruct the view.

The prior art illustrates these and additional difficulties. U.S. Pat. No. 4,733,745 discloses an adjustable control attachment for an earth moving vehicle. The steering column is capable of rotation around the base. The drawback to this design is that a smaller individual would need to move the operator's seat rearward, this would move the operator away from any floor pedals. Additionally, the lower portion of the steering column may obstruct the operator's view.

U.S. Pat. No. 4,993,279 discloses a tilt steering column latch release. This column again has a single pivot axis, but also possesses a release mechanism to allow the steering column to move to a lower position to allow easy maintenance.

U.S. Pat. No. 5,088,342 discloses a pivotable steering wheel mechanism and biasing means. The steering column again possesses a single pivoting point which could limit the operator's range of vision.

U.S. Pat. No. 5,168,768 discloses a tilt steering column assembly. The steering column has a single pivot and is capable of being moved back into the original position after being moved.

U.S. Pat. Nos. 5,035,446 and 4,972,732 disclose tilt-telescope steering column for automobiles. Both devices are designed to be attached to a vertical surface. The steering column can telescope and can tilt. The lower portion of the column is fixed and could obstruct an operator's view.

Consequently, the need exists for a steering column which will provide an unobstructed view of farming operations by being able to move in four directions.

OBJECTS OF THE INVENTION

It is an object of the present invention to provide a floor mounted steering column which has two pivot axis' and two telescoping sections.

It is a further object of the present invention to provide a cover which can be placed over the steering column thus preventing damage to the mechanism.

It is a further object of the present invention to provide an steering column which uses a gas cylinders to alter its' position.

It is a further object of the present invention to provide a foot pedal to control the gas cylinder.

It is a further object of the present invention to provide a steering column which can accommodate a variety of individuals regardless of their size.

It is a further object of the present invention to provide a steering column which has an input shaft which may transmit the rotation placed on the steering wheel to a steering motor, even if the input shaft has two pivot points.

It is a further object of the present invention to provide a steering column which can has a telescoping section near the base and telescoping section near the steering wheel and still transmit the rotation to the steering motor.

It is a further object of the present invention to provide a steering column which has a cover that will cover the steering column regardless of the position the column is placed.

SUMMARY OF THE INVENTION

The invention overcomes the deficiencies of the prior art. The invention provides a steering column which can be adjusted in four ways. The steering column has a base support with a steering motor. An input shaft takes the rotational force placed on the steering wheel and transmits it to the steering motor. The input shaft has an upper telescoping shaft to which the steering wheel is attached. An upper locking knob on the steering wheel allows the upper telescoping shaft to telescope upward or downward. Surrounding the upper telescoping shaft is the upper input shaft. A first universal joint connects the upper input shaft to an inner input shaft. An elongated key on the exterior circumference of the inner input shaft transfers the torque to a key slot on the interior circumference of the outer input shaft. The outer input shaft is connected to the lower input shaft which is connected to the steering motor. The lower pivot assembly is pivotially affixed to the base support. The lower pivot assembly and base support are also aligned with the second universal joint. The lower pivot assembly is also capable of telescoping upwards or downwards by loosening the lower locking knob. The lower pivot assembly can be rotated about the base support by a lower gas cylinder that is actuated by a foot pedal. Attached to the lower pivot assembly is the upper pivot assembly. The upper pivot assembly has an upper sub-assembly pivotially affixed to the upper shaft. The upper sub-assembly and upper shaft are aligned with the first universal joint. The upper shaft can be rotated about the upper sub-assembly by an upper gas cylinder which is actuated by an upper tilt lever. Protecting the entire steering column is a cover. The cover consists of a flexible boot surrounding the base support. Above the boot is a non-flexible lower cover with a lower region and first concave portion. The lower region is inserted into the boot. Above the lower cover is the non-flexible middle cover with a second concave portion and upper region. The second concave portion generally covers the first concave portion. The upper region is inserted into an upper cover.

BRIEF DESCRIPTION OF THE DRAWINGS

The advantages of this invention will be apparent upon consideration of the following detailed disclosure of the invention, especially when taken in conjunction with the accompanying drawings wherein.

DETAILED DESCRIPTION OF THE INVENTION

Figure 1:
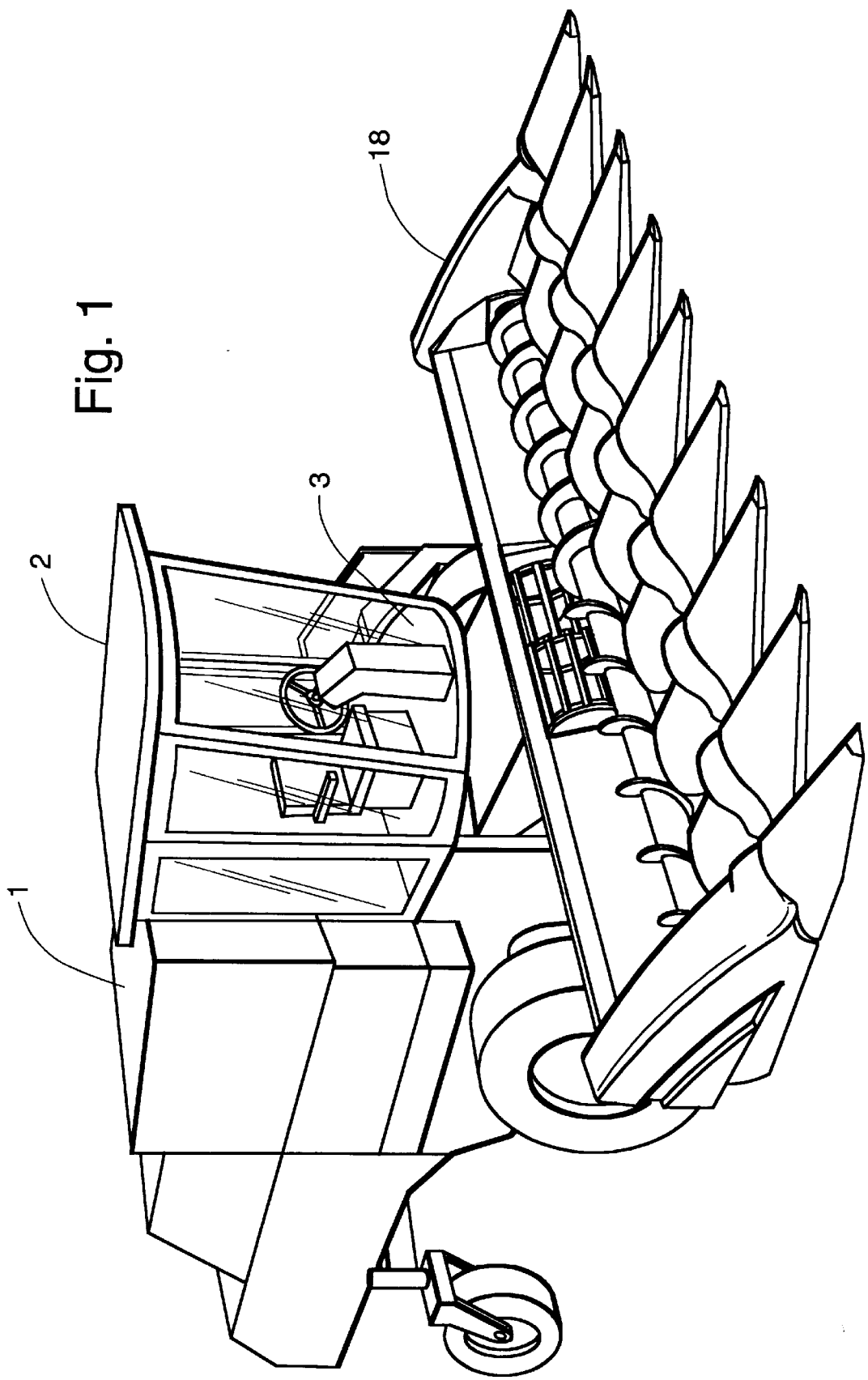
FIG. 1 is a general view of a combine harvester combine with a cab containing the present invention.

Referring to the drawings, it is possible to observe the major elements and general operation of the present invention. Left and right references are used as a matter of convenience and are determined by standing at the rear of the combine and facing the forward end in the normal direction of travel. Likewise, forward and rearward are determined by normal direction of travel of the combine. Upward or downward orientations are relative to the ground or operating surface. Horizontal or vertical planes are also relative to ground.

Figure 2:
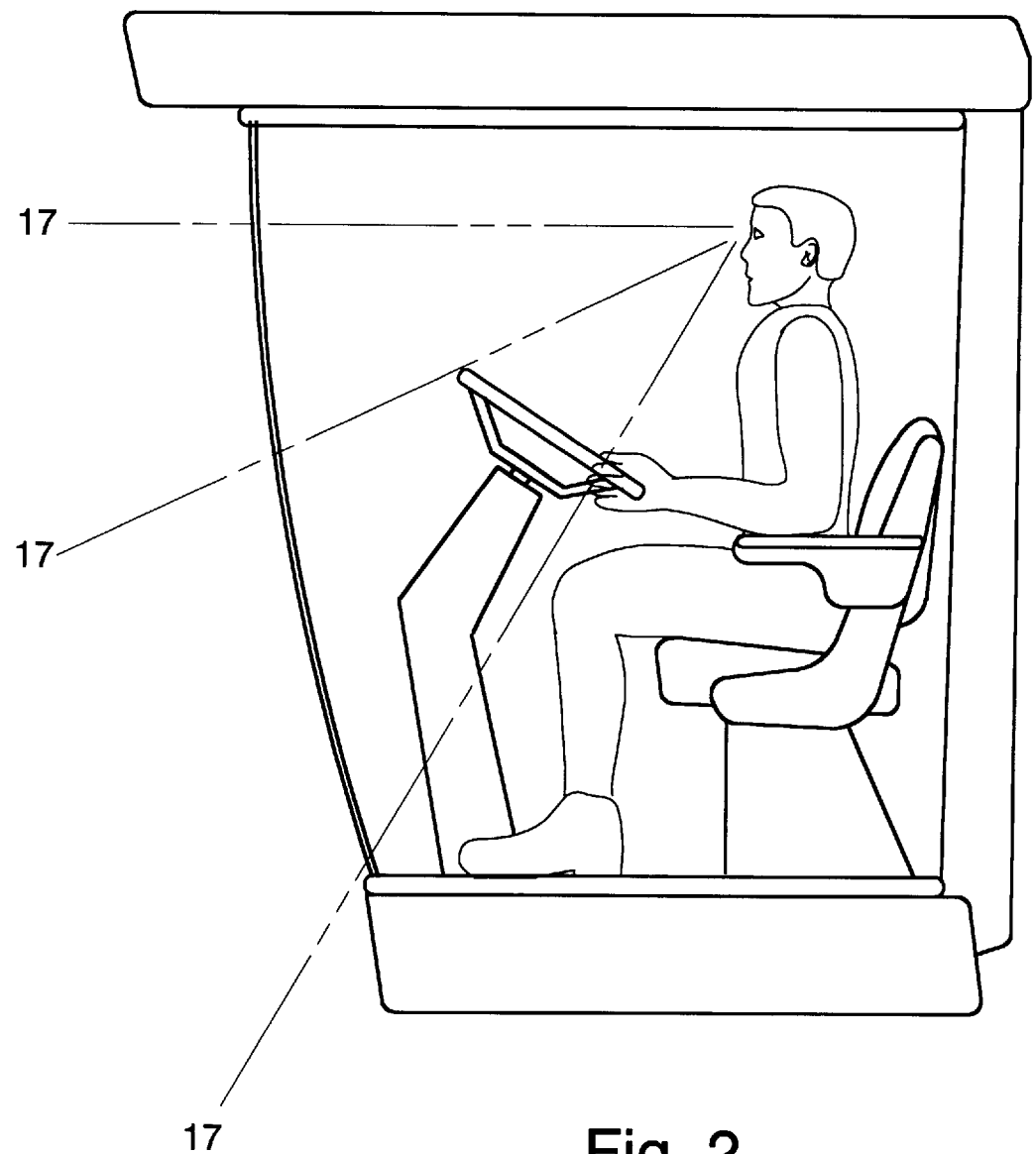
FIG. 2 is side view of the cab illustrating the prior art steering column arrangement.

The invention is located within the cab of a combine. A typical combine has a header for cutting a crop. As the combine and header are moved forward, the grain and stalk are cut by the header. The header moves the grain into an auger trough. A transverse auger pushes the grain and stalk in the auger trough to the center of the header. Located at the center of the header is the feeder house or elevator. The feeder house moves the grain and stalk rearward into the threshing and separation systems of the combine. After processing and separation, the processed grain is stored in a grain tank located near the top of the combine. The trash or chaff is ejected from the rear of the combine. The operator runs the combine from the cab located behind the header and at the front of the combine. From the cab the operator can observe most the various combine functions. The cab usually has a large glass window or several windows which afford the operator the maximum ability to monitor the header. Located in the center of the cab is the steering column with a steering wheel attached. By turning the steering wheel, the operator manipulates various elements within the steering column which, in turn, controls a steering motor which turn the wheels of the combine. Located behind the steering column is an operators chair. The prior art steering column is illustrated by FIG. 2. The operation has a partially obstructed view 17 when looking downwards and out of the cab. The steering column is blocking a portion of the operator's view.

The present invention 10 is located within the cab 2 of the combine 1. The steering column is affixed to the horizontal cab floor 3 by the base support 20. Above the base support 20 is the lower pivot assembly 30. Above the lower pivot assembly 30 is the upper pivot assembly 60. Running coaxially with the upper pivot assembly 60, lower pivot assembly 30 and base support 20 is the input shaft 110. Attached to the input shaft 110 is the steering wheel 90. The opposite end of the input shaft 1 10 is connected to the steering motor 24 located beneath the base support 20. The invention 10 is capable of four types of motion. The input shaft 110 near the steering wheel 90 can telescope up and down, the steering column near the lower pivot assembly 30 can also telescope up and down. Furthermore, the column 10 can rotate about pivot located between the base support 20 and the lower pivot assembly 30. The column 10 can also rotate about a pivot located in the upper pivot assembly 60. The entire assembly, regardless of position or height is protected by a cover. These items will be discussed in greater detail below. The range of motion offered by the steering column enables the steering wheel to be positioned in a manner to provide an unobstructed view 17 of the header 18. This is true regardless of whether the individual has a small build 16 or large build 15. Further, the steering column 10 may be positioned so that the steering wheel 90 can be in a conventional operating position 14 or a horizontal operating position (12 or 13). The horizontal operating position offers the driver maximum comfort and unobstructed view for an extended time period.

Affixed to the horizontal cab floor 2 is the base support 20. Located beneath the base support 20 is the steering motor 24. The steering motor 24 moves the combine wheels.

Attached to the base support 20 is pedal stop 21. The pedal stop 21 is pivotially attached to the base support 20. Attached to the pedal stop is a pedal spring 25. Attached to the side of the pedal stop 21 is the foot pedal 22. The foot pedal 22, pedal stop 21 and pedal spring 25 actuate the lower gas cylinder 37. The lower gas cylinder 37 will be discussed in more detail later.

The input shaft 110 has several pieces. The upper telescoping shaft 111 is located within the upper input shaft 112. The upper telescoping shaft 111 and upper input shaft are conventional telescoping shafts manufactured by a variety of sources. In the preferred embodiment, the shafts are manufactured by Douglas Autotech Corp. of Bronson, Mich. and have parts no. 48528, 48527, 48197 and 48188. Attached to the upper telescoping shaft 111 is the steering wheel 90. By turning the upper locking knob 91 located in the center of the steering wheel, the upper telescoping shaft 111 can be raised or lower relative to the upper input shaft 112. Affixed to the upper input shaft 112 is the first universal joint 116. The first universal joint 116 connects the upper input shaft 112 to the inner input shaft 113. The inner input shaft 113 has a torque transfer means illustrated as an elongated key 118, on its' exterior circumference 120. Surrounding the inner input shaft 113 is the outer input shaft 114. A torque receiving means illustrated as key slot 121 is located on the interior circumference 119 of the outer input shaft. The inner input shaft 113 is capable of moving up or down relative to the outer input shaft 114. The elongated key 118 which is inserted into the key slot 121 transfers the rotation of the inner input shaft 113 to the outer input shaft 114. Attached to the outer input shaft 114 is the second universal joint 117. The second universal joint 117 connects the outer input shaft 114 to the lower input shaft 115. The lower input shaft 115 is connected to the steering motor 24. The lower input shaft may also have an elastic isolator 23 for dampening vibrations from the steering motor 24 and the rest of the combine 1.

The lower pivot assembly 30 consists of a first lower telescoping shaft 31 and a second lower telescoping shaft 34. The first lower telescoping shaft 31 surrounds the second lower telescoping shaft 34. The first lower telescoping shaft 31 slides relative to the second lower telescoping shaft 34. Within and coaxial to the second lower telescoping shaft 34 is the outer input shaft 114 and the inner input shaft 113. The second lower telescoping shaft 34 is attached to the lower sub-assembly 35. The lower sub-assembly 35 is pivotially attached to the base support 20. The second universal joint 117 is aligned at the pivot point between the lower sub-assembly 35 and base support 20. Also attached to the lower sub-assembly 35 is the lower cylinder mount 36. The second lower telescoping shaft has vertical groove 32. The first lower telescoping shaft 31 has four cover attachment mounts 45. Additionally, the first lower telescoping shaft 31 has a threaded bore 41. Inserted in the threaded bore 41 is the clamping washer 42. A lower locking knob 33 is used in conjunction with the threaded bore 41, the clamping washer 42 and vertical groove 32 to prevent the first lower telescoping shaft 31 from sliding or rotating about the second lower telescoping shaft 34. The lower locking knob 33 has a threaded portion 44 and a shoulder 43 at the tip. The shoulder 43 is inserted into the threaded bore 41, clamping washer 42 and vertical groove 32. The threaded portion 44 and threaded bore 41 are tightened. This forces the clamping washer 42 against the second lower telescoping shaft 34 preventing the first lower telescoping shaft from translating up or down. The shoulder 43 within the vertical groove 32 prevent the first lower telescoping shaft 31 from rotating about the second lower telescoping shaft 34. In a secondary embodiment, a lift assist spring 122 is placed about the second lower telescoping shaft 34. The spring 122 exerts an upward force on the first lower telescoping shaft 31 making in easier to translate when the lower locking knob 33 is loosened.

Affixed to the first lower telescoping shaft 31 is the upper pivot assembly 60. The upper pivot assembly 60 has an upper sub assembly 64 pivotially affixed to the upper shaft 61. The first universal joint 116 is aligned at the pivot point between upper sub assembly 64 and upper shaft 61. Attached to the upper sub-assembly 64 is the upper cylinder mount 64. Attached to the upper shaft 61 is the control bracket 62 and the upper rod mount 66. Surrounding the upper shaft 61 is the upper cover 63. The upper input shaft 112 and upper telescoping shaft 111 are located within and coaxially to the upper shaft 61.

The upper gas cylinder 67 has an upper cylinder attach 70, a upper valve actuator 68, an upper rod mount 66 and a upper tilt lever 69. The upper cylinder attach 70a is pivotially attached at 70a to the upper cylinder mount 65 on the upper sub-assembly 64. The upper valve actuator 68 is pivotially attached to the upper rod mount 66. The upper tilt lever 69 controls the upper valve actuator 68. By moving the upper tilt lever 69, the gas cylinder 67 may be lengthened or shortened. This results in the upper shaft 61 pivoting 5 about the upper sub-assembly 64. By using a gas cylinder, the upper shaft 61 may be pivoted 5 relative to the upper sub-assembly to an infinite number of positions. Relative the upper sub-assembly 64, the upper shaft 61 can rotate 5 a total of 50 degrees. In the preferred embodiment, the range, measured from the vertical axis is 35 degrees in the forward rotation and 15 degrees in a rearward rotation. The 35 degree forward rotation is denoted by $\beta$ in FIG. 10 and the 15 degree rearward rotation is denoted by $\chi$ in FIG. 10.

The lower gas cylinder 37 has a lower cylinder attach 38 and a lower valve actuator 40. The lower cylinder attach 38 is pivotially attached to the lower cylinder mount 36. The lower valve actuator 40 is attached by 37a to the base support 20. The lower valve actuator 40 is controlled by the pedal stop 21. The pedal stop 21 is controlled by the foot pedal 22. The pedal stop 22 and pedal spring 25 prevent an operator from placing too great of a force on the foot pedal 22 that might damage the lower gas cylinder 37. When an operator depresses the foot pedal 22 on a force sufficient to operate the lower valve actuator 40 is received by the valve. The excess force is transmitted to the pedal stop 21. The spring 26 returns the pedal 21 to its normal position. By depressing the foot pedal 22, the lower gas cylinder 37 may be lengthened or shortened. This results in the lower pivot assembly 30 pivoting 4 about the base support 20. By using a gas cylinder, the lower pivot assembly 30 may be pivoted 4 relative to the base support 20 to an infinite number of positions. Relative to the base support 20, the lower pivot assembly 30 can rotate 4 a total of 42 degrees. In the preferred embodiment, the range, measured from the vertical axis is 0 degrees in the forward rotation and 42 degrees in a rearward rotation. This is indicated by $\alpha$ in FIG. 10.

Figure 8:
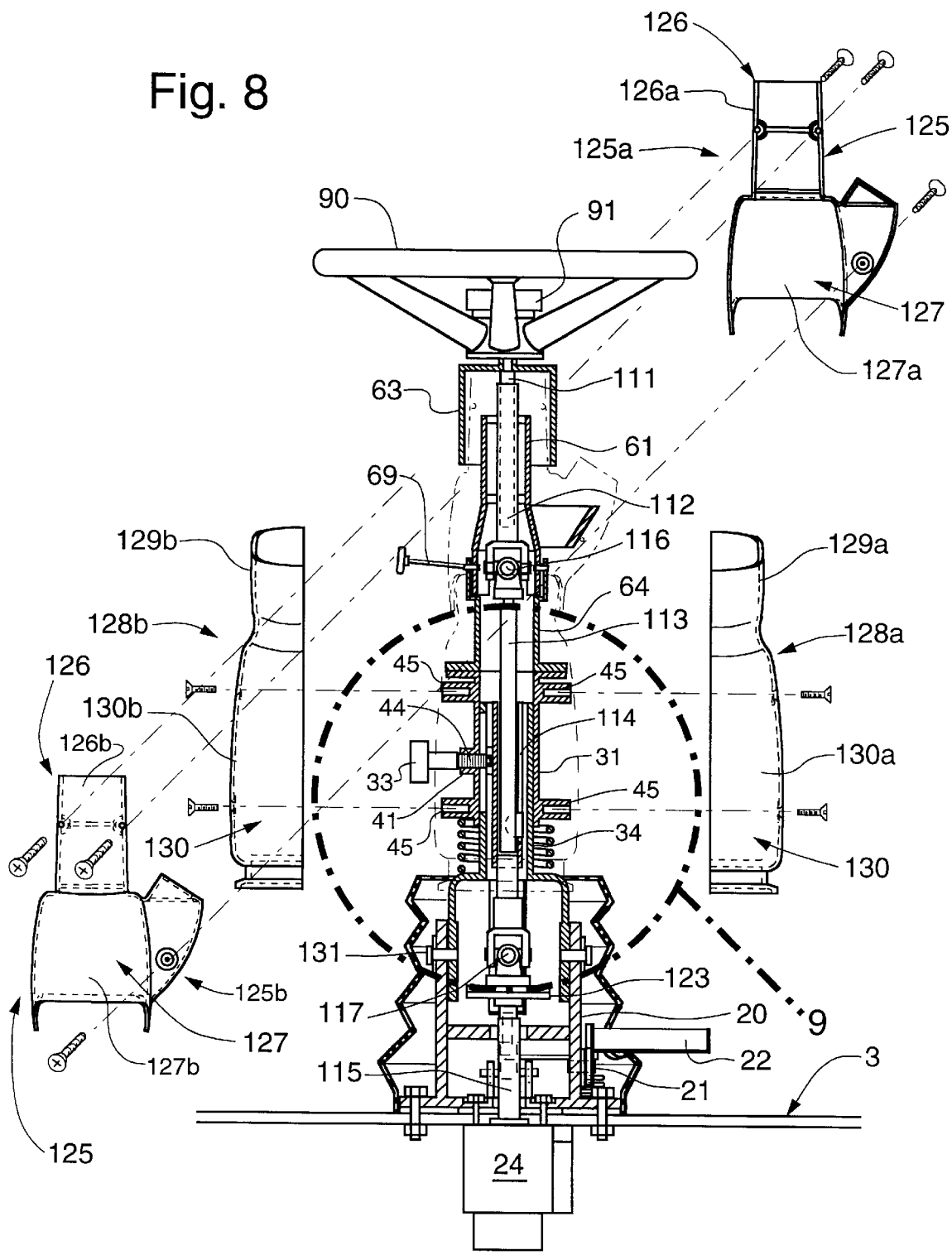
FIG. 8 is a front view of the present invention showing the covers.
Figure 9:
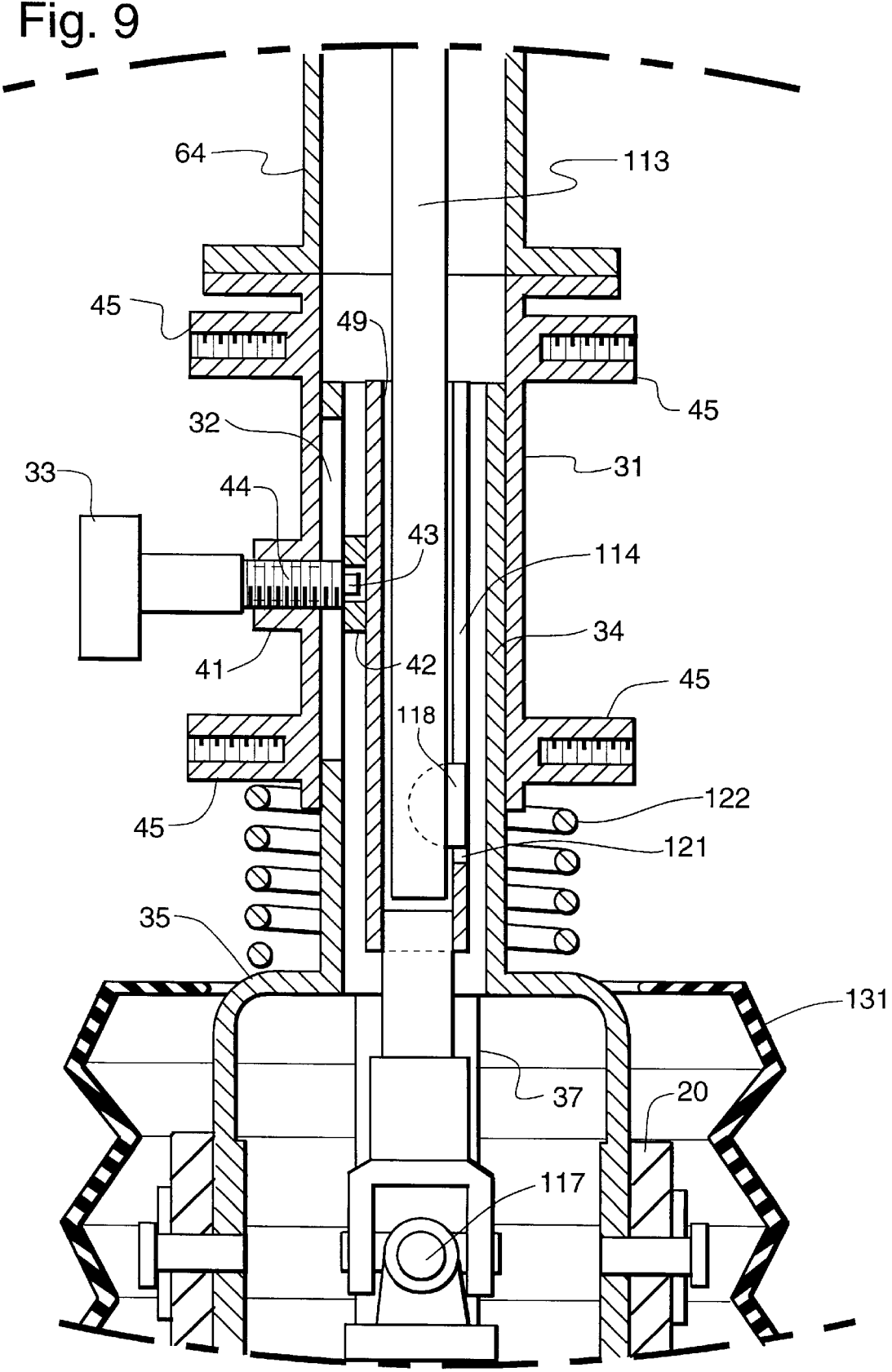
FIG. 9 is an enhanced view of the lower locking knob, first lower telescoping shaft, second lower telescoping shaft, outer input shaft and inner input shaft.

The steering column 20 has several covers to protect the invention. There is a flexible boot 131 attached to the horizontal cab floor 3 and surrounding the base support 20. Above the flexible boot 131 is the non-flexible lower cover 128a and 128b FIG. 8 illustrates the lower cover before final assembly. The lower cover, prior to final assembly consists of a left-side 128a and a mirror image right-side 128b. In the preferred embodiment, the assemblied non-flexible lower cover 128 is composed of a hard plastic. The lower cover 128 consists of a lower region 130 (*a* and *b*) and a first concave portion 129*a* and 129*b*. The first concave portion 129*a* and 129*b* is generally spherically shaped. The lower cover 128 is attached to the cover attachment mounts 45 on the first lower telescoping shaft 31. The four attachment points are located in the lower region 130. The lower region 130 is placed inside of the flexible boot 131. As the first lower telescoping shaft 31 moves relative to the second telescoping shaft 34, the lower cover 128 remains positioned over the both shafts. Above the non-flexible lower cover 128 is the non-flexible middle cover 125. FIG. 8 illustrates the front 125*a* and mirror-image rear 125*b* of the middle cover prior to final assembly. In the preferred embodiment, the non-flexible middle cover 125 is composed of a hard plastic. The middle cover 125 (*a* and *b*) consists of an upper region 126 (*a* and *b*) and a second concave portion 127 (*a* and *b*). The second concave portion 127 is generally spherically shaped and partially encompasses the first concave portion 129. The middle cover 125 is attached near the upper shaft 61 and the control bracket 62. The upper region 126 is placed inside of the upper cover 63. As the upper telescoping shaft 111 moves relative to the upper input shaft 112, the middle cover 125 remains positioned over the both shafts. The second concave portion 127 is able to rotate over the first concave portion 129. The second concave portion 127 protects the top of the first concave portion 129.

Figure 3:
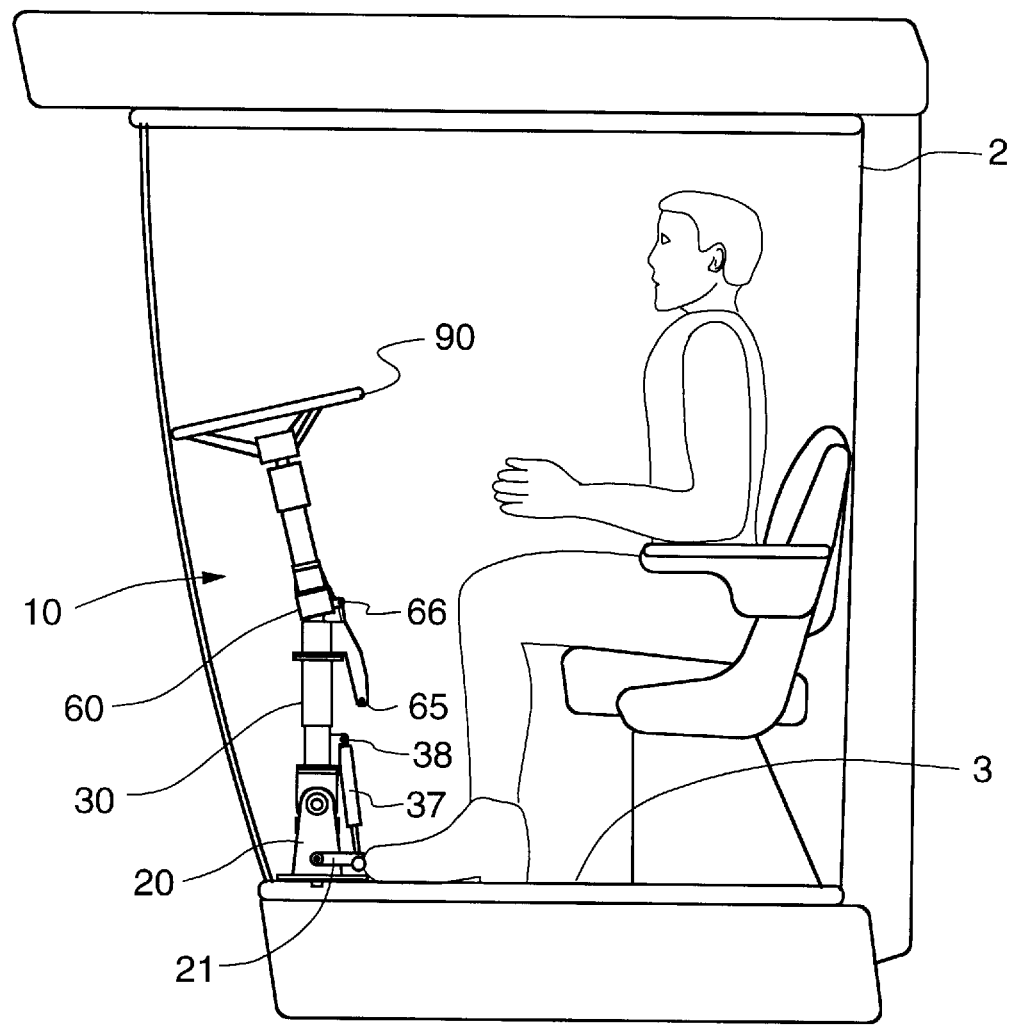
FIG. 3 is a side view of the cab illustrating the present invention with the steering column in a stowed position for entrance and egress to the operator's seat.
Figure 4:
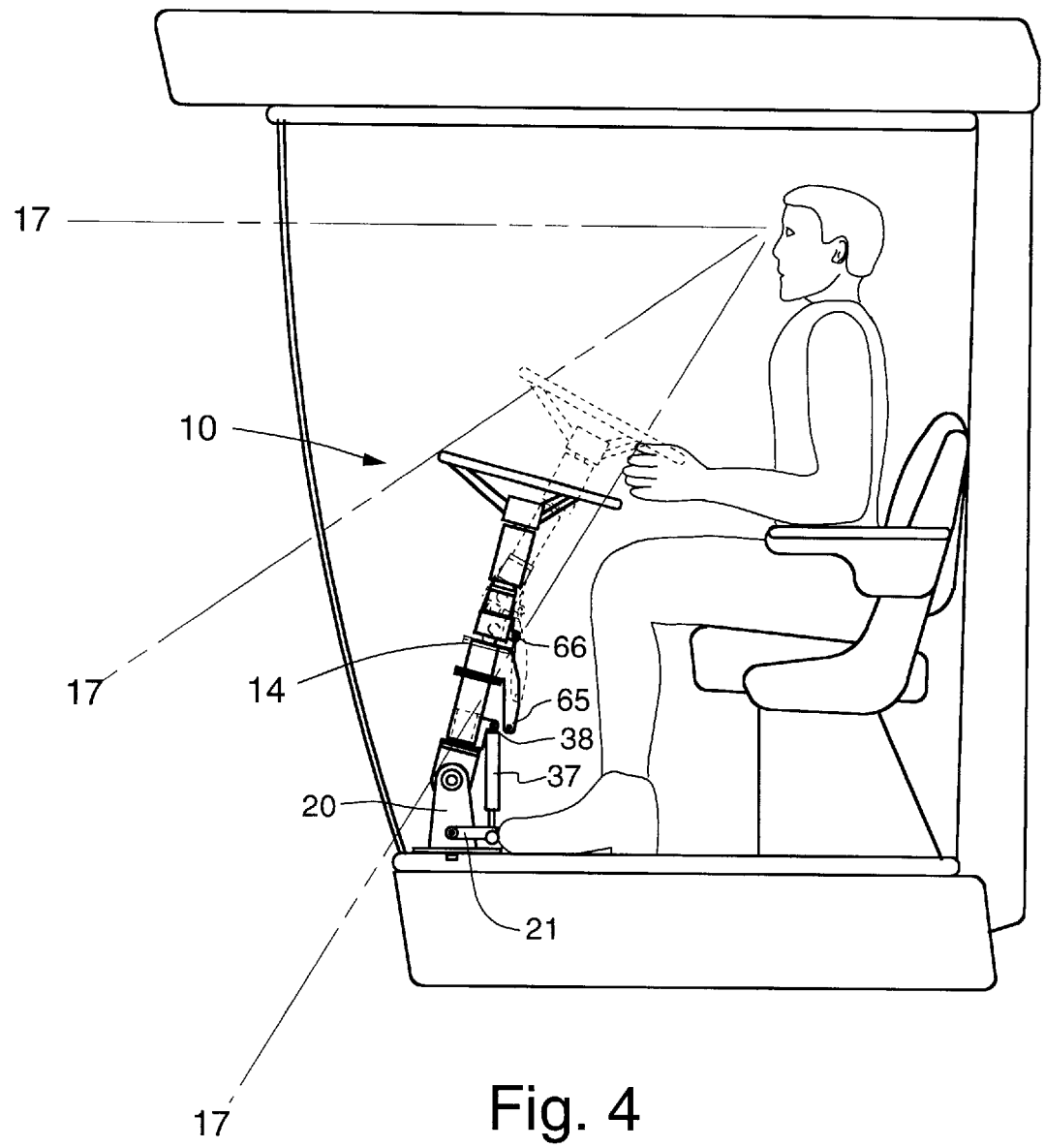
FIG. 4 is a side view of the cab illustrating the present invention with the steering column in the conventional driving position. The phantom lines illustrate the ability for the operator to tilt or telescope the upper shaft.
Figure 5:
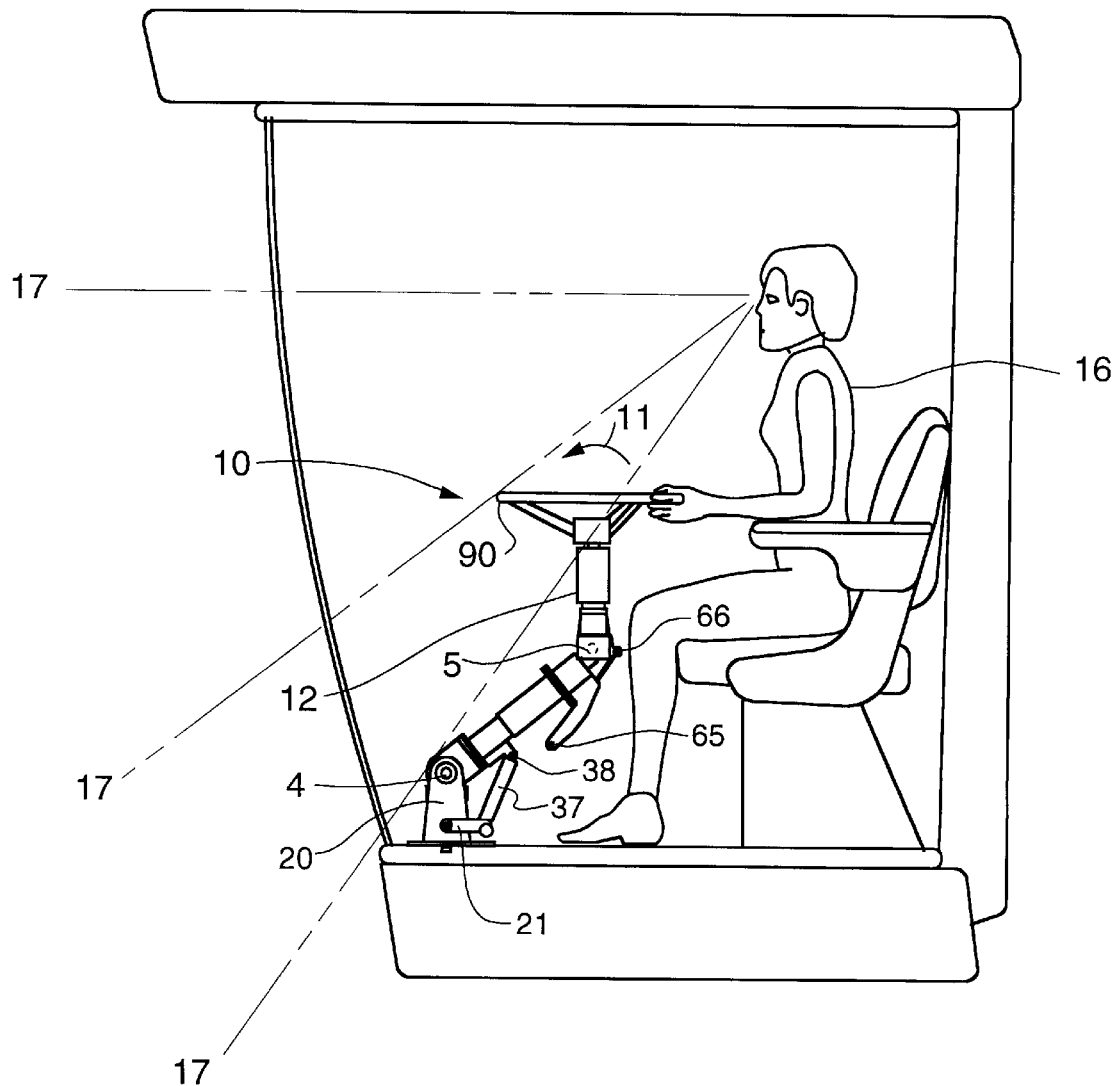
FIG. 5 is a side view of the cab illustrating the present invention with the steering column in the horizontal driving position for an operator having a small build.
Figure 6:
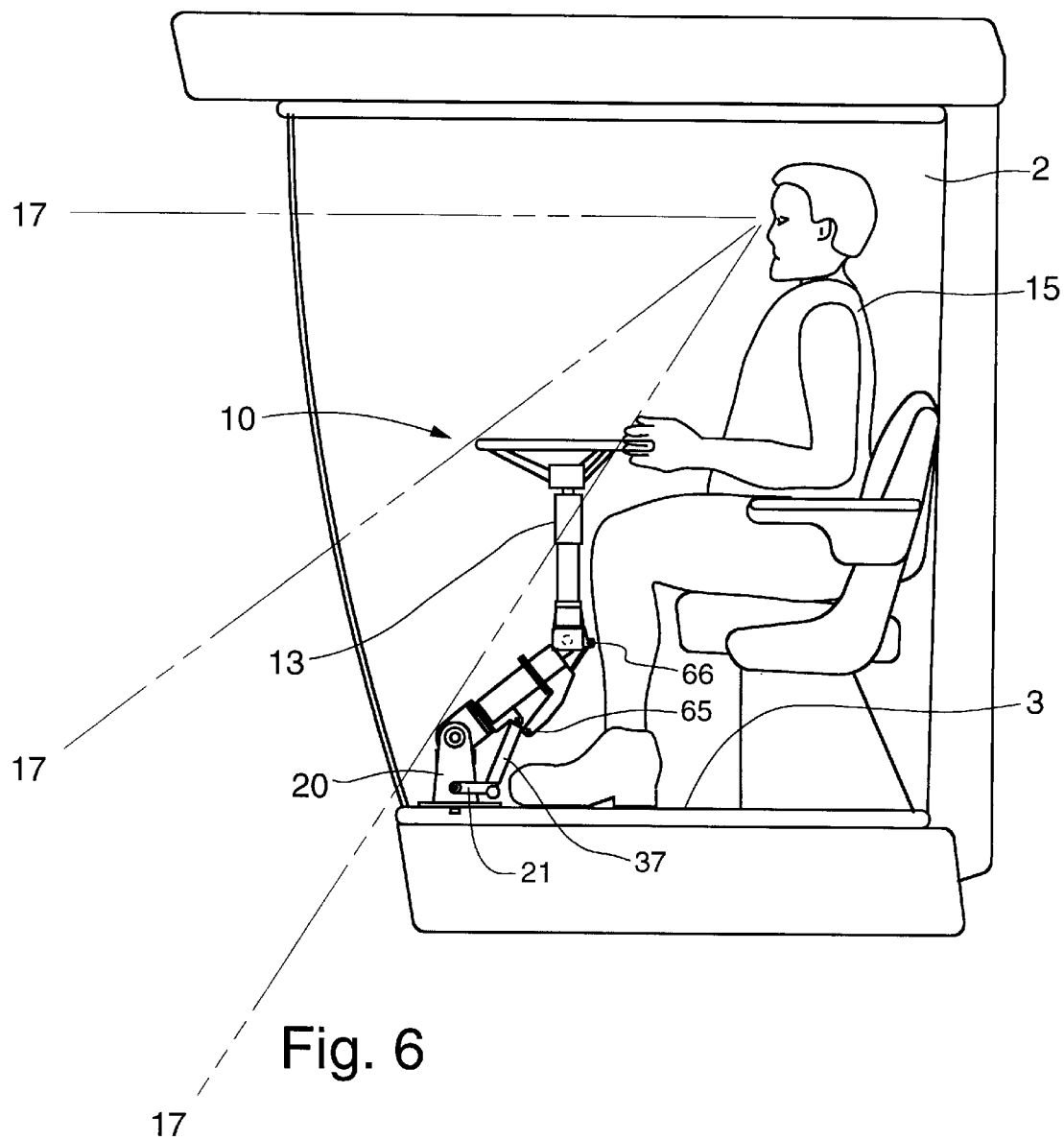
FIG. 6 is a side view of the cab illustrating the present invention with the steering column in the horizontal driving position for an operator having a large build.
Figure 7:
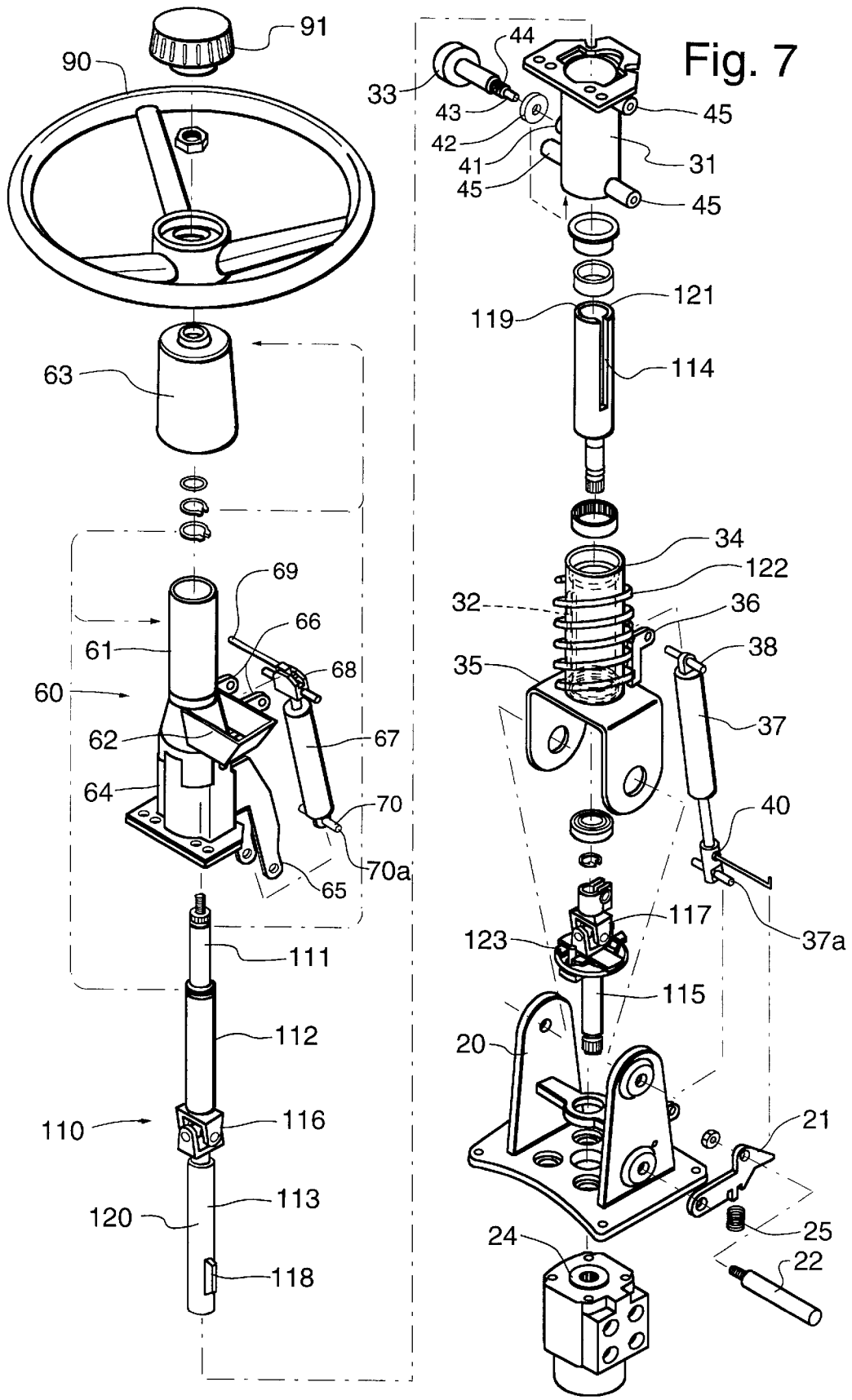
FIG. 7 is an exploded view of the present invention.
Figure 10A:
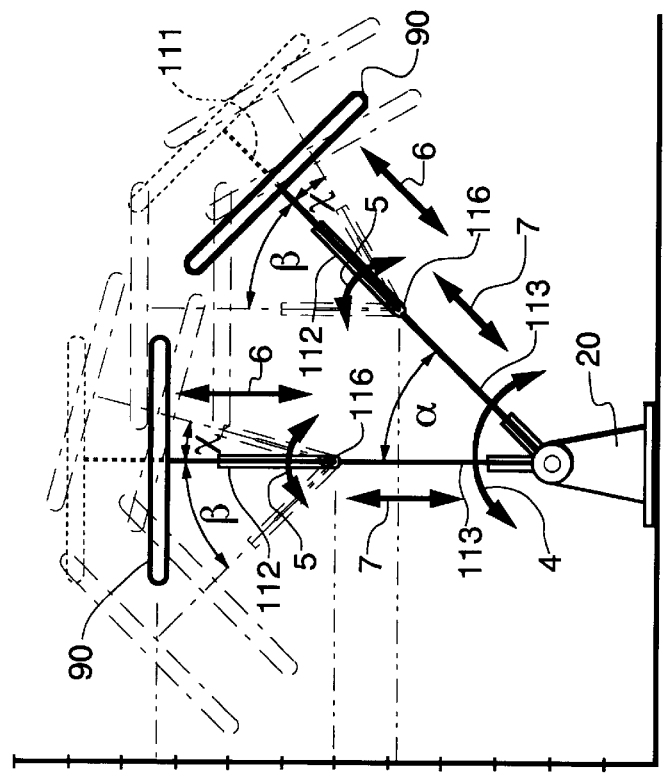
FIG. 10 is a view illustrating the range of motion of the steering column.
Figure 10B:
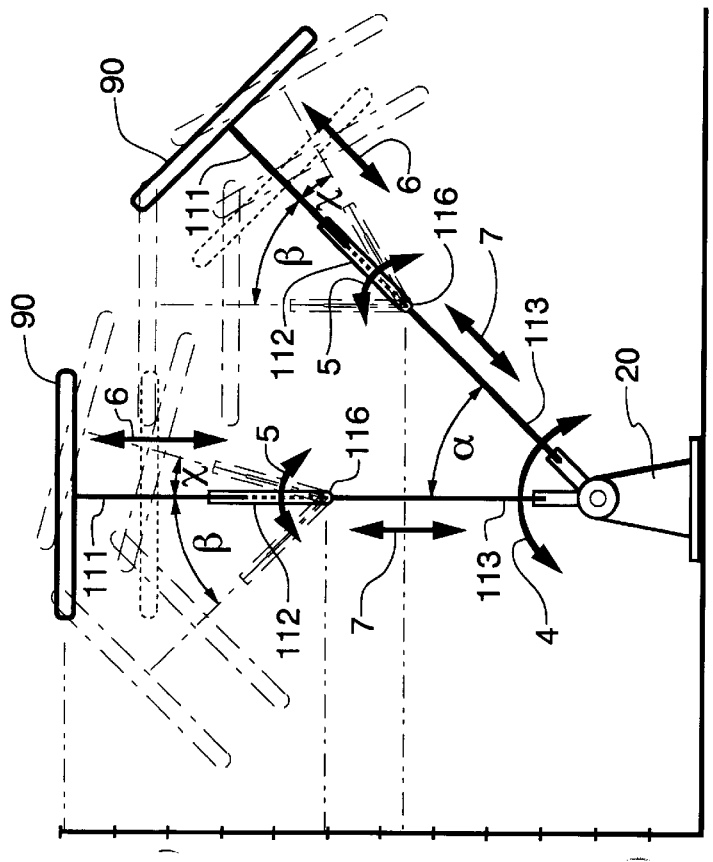

To operate the steering column 10, the operator places a rotational force 11 on the steering wheel 90. The force 11 is transmitted to the input shaft 110. The upper telescoping shaft 111 is attached to the upper input shaft 112 which is attached to the first universal joint 116. The first universal joint 116 is connected to the inner input shaft 113. The elongated key 118 transmits the torque to the key slot 121 in the outer input shaft 114. The outer input shaft is connected to the second universal joint 117. The second universal joint 117 is attached to the lower input shaft 115. The lower input shaft 115 is connected to the steering motor 24. The steering column 10 can be adjusted in four ways as illustrated in FIG. 10. The upper telescoping shaft 111 can translate relative to the upper input shaft 112 (see item 6) to raise or lower the steering wheel 90. This is accomplished by loosening the upper locking knob 91 on the steering wheel 90. The first lower telescoping shaft 31 can translate relative to the second lower telescoping shaft 34 (see item 7) to raise or lower the upper pivot assembly 60, upper input shaft 112, upper telescoping shaft 111 and the steering wheel 90. This is accomplished by loosening the lower locking knob 33. The steering column 10 is capable of rotating about the upper pivot assembly 60. This is accomplished by moving the upper tilt lever 69. This actuates the upper gas cylinder 67 causing the cylinder to lengthen or shorten. This causes the upper shaft 61 to pivot relative to the upper sub-assembly 64. The steering column 10 is also capable of rotating about the base support 20 and lower pivot assembly. This is accomplished by depressing the foot pedal 22. This actuates the lower gas cylinder 37 causing the cylinder to lengthen or shorten. This causes the lower sub-assembly 35 to pivot relative to the base support 20. The steering column can be positioned in a conventional steering position 14 or in a horizontal steering position 12 or 13. The steering column can be positioned for a small individual 12 or an large individual 13. The horizontal operating position offers the most comfortable steering position without an obstructed view. The steering column 10 can also be positioned to allow easy entrance and egress from the cab 2 as illustrated in FIG. 3. The second lower telescoping shaft 34 is oriented in a vertical (0 degrees) position and the upper shaft is oriented at minus 35 degree position (whereby the steering wheel is forward of the vertical axis). This allows for the operator to reach or depart the seat. FIG. 10 illustrates the range of motion of the steering column. FIG. 10A shows the rotation 4 about the lower pivot assembly 30 and the base support 20 while the lower telescoping shafts are fully extended 7. The upper telescoping shafts can be translated to several positions as indicated by item 6. The upper telescoping shafts rotates 5 to a range β+χ(50 degrees). The range is minus 35 degrees (β) towards the front of the cab and measured from the vertical axis. The range is 15 degrees (χ) towards the rear of the cab and measured from the vertical axis. FIG. 10B shows the lower telescoping shafts retracted 7. However, the rotation of the lower telescoping sections 4 and the upper telescoping shafts 5 remain the same. The translation 7 of the lower telescoping shafts can be adjusted to an infinite range (as can the translation 6 of the upper telescoping shafts).

It will be obvious to those skilled in the art that various changes may be made without departing from the scope of the invention and the invention is not to be considered limited to what is illustrated in the drawings and described in the specification.

What is claimed is:

1. A four-way adjustable floor mounted steering column, comprising:

a. a base support affixed to a horizontal cab floor, said support having a steering motor;

b. a lower pivot assembly pivotially affixed to the base support, said lower pivot assembly also slideably moveable relative to the base support;

c. an upper pivot assembly pivotially affixed to the lower pivot assembly;

d. an input shaft located coaxially with the upper pivot assembly, the lower pivot assembly and base support said input shaft affixed to the steering motor, said input shaft having an upper telescoping shaft, said upper telescoping shaft having a steering wheel;

e. a lower gas cylinder connecting the base support and the lower pivot assembly; and f. an upper gas cylinder for pivoting the upper pivot assembly, whereby the input shaft transmits a rotation force placed on the steering wheel to the steering motor and the steering column is able to translate on an axis defined by the upper telescoping shaft and also translate on an axis defined by the lower pivot assembly, and the steering column is able to rotate about the lower pivot assembly by actuating the lower gas cylinder and rotate about the upper pivot assembly by actuating the upper gas cylinder.

2. The four-way adjustable floor mounted steering column described in claim 1 further comprising:

a. a flexible boot affixed to the horizontal cab floor;

b. a non-flexible lower cover with a lower region and a first concave portion, said lower cover located coaxially with the lower pivot assembly, the lower cover affixed to said lower pivot assembly, said lower region inserted within the flexible boot; and c. a non-flexible middle cover with an upper region and with a second concave portion said second concave portion partially surrounding the first concave portion, said middle cover located coaxially with the upper pivot assembly, said upper region inserted within an upper cover.

3. A four-way adjustable floor mounted steering column, comprising:
   a. a base support affixed to a horizontal cab floor, said support having a steering motor;
   b. a lower pivot assembly pivotially affixed to the base support, said lower pivot assembly having a first lower telescoping shaft;
   c. an upper pivot assembly having an upper shaft pivotially affixed to an upper sub-assembly, the upper sub-assembly affixed to the first lower telescoping shaft;
   d. an input shaft located coaxially with the upper shaft, the upper sub-assembly, the lower pivot assembly and base support said input shaft affixed to the steering motor, said input shaft having an upper telescoping shaft, said upper telescoping shaft having a steering wheel;
   e. a lower gas cylinder connecting the base support and the lower pivot assembly; and
   f. an upper gas cylinder connecting the upper sub-assembly and upper shaft, whereby the input shaft transmits a rotation force placed on the steering wheel to the steering motor and the steering column is able to translate on an axis defined by the upper telescoping shaft and also translate on an axis defined by the first lower telescoping shaft, and the steering column is able to rotate about the lower pivot assembly by actuating the lower gas cylinder and rotate about the upper pivot assembly by actuating the upper gas cylinder.

4. The four-way adjustable floor mounted steering column described in claim 3, wherein the input shaft further comprises:
   a. an inner input shaft pivotially connected to the upper input shaft by a first universal joint, the inner input shaft having a torque transfer means located on an exterior circumference;
   b. an outer input shaft located coaxially to the inner input shaft, said outer input shaft also slideably connected to the inner input shaft, the outer input shaft having a torque receiving means located on an interior circumference; and
   c. a lower input shaft connected to the outer input shaft by a second universal joint, said lower input shaft connected to the steering motor.

5. The four-way adjustable floor mounted steering column described in claim 4, wherein the lower pivot assembly further comprises:
   a. a lower sub-assembly having a lower cylinder mount;
   b. a second lower telescoping shaft affixed to the lower sub-assembly, said second lower telescoping shaft located coaxially with the first lower telescoping shaft, the outer input shaft and inner input shaft, said second lower telescoping shaft having a vertical groove therein;
   c. a lower locking knob assembly having a shoulder, a threaded portion and a clamping washer; and
   d. said first lower telescoping shaft having a plurality of cover attachment mounts, said first lower telescoping shaft also having a threaded bore, therein for receiving the clamping washer, whereby the first lower telescoping shaft translates over the second lower telescoping shaft.

6. The four-way adjustable floor mounted steering column described in claim 5, wherein the torque transfer means comprises an elongated key.

7. The four-way adjustable floor mounted steering column described in claim 6, wherein the torque receiving means comprises a key slot whereby the elongated key is inserted into the key slot.

8. The four-way adjustable floor mounted steering column described in claim 7 wherein the upper pivot assembly further comprises:
   a. said upper shaft has an upper cover, a control bracket and upper rod mount, said upper cover coaxial to the upper shaft; and
   b. said upper sub-assembly having an upper cylinder mount.

9. The four-way adjustable floor mounted steering column described in claim 8 wherein the upper gas cylinder further comprises:
   a. an upper cylinder attach rod which is pivotially affixed to the upper cylinder mount; and
   b. an upper valve actuator pivotially affixed to the upper rod mount, said valve actuator controlled by an upper tilt lever.

10. The four-way adjustable floor mounted steering column described in claim 9 wherein the base support further comprises:
   a. a pedal stop pivotially affixed to the base support;
   b. a pedal spring affixed to the pedal stop; and
   c. a foot pedal affixed to the pedal stop.

11. The four-way adjustable floor mounted steering column described in claim 10 wherein the lower gas cylinder further comprises:
   a. a lower cylinder attach rod which is pivotially affixed to the lower cylinder mount; and
   b. a lower valve actuator pivotially affixed to the pedal stop, said valve actuator controlled by the foot pedal.

12. The four-way adjustable floor mounted steering column described in claim 11 further comprising:
   a. a flexible boot affixed to the cab floor;
   b. a non-flexible lower cover with a lower region and a first concave portion, said lower cover located coaxially with the first lower telescoping shaft, the lower cover affixed to the cover attachment mount, said lower region inserted within the flexible boot; and
   c. a non-flexible middle cover having an upper region and a second concave portion said second concave portion partially surrounding the first concave portion, said middle cover located coaxially with the upper shaft, said upper region inserted within the upper cover.

13. The four-way adjustable floor mounted steering column described in claim 12 wherein the lower pivot assembly further comprises a lifting assist spring located coaxially with the second lower telescoping shaft, whereby the first lower telescoping shaft can be lifted.

14. The four-way adjustable floor mounted steering column described in claim 13 wherein an angle defined by a vertical axis from the cab floor and the second lower telescoping shaft is in a range of 0 to 42 degrees.

15. The four-way adjustable floor mounted steering column described in claim 14 wherein an angle defined by vertical axis from the cab floor and the upper shaft is in a range of minus 35 degrees to 15 degrees.

16. The four-way adjustable floor mounted steering column described in claim 15 wherein the upper telescoping shaft is controlled by an upper locking knob.

17. The four-way adjustable floor mounted steering column described in claim 16 wherein the lower input shaft has an elastic isolator.

18. In a cab of a combine harvester, said cab having a steering column affixed to a horizontal cab floor by a base support, a flexible boot affixed to the cab floor and surrounding the base support, said steering column having an input shaft for transferring a rotational force placed on a steering wheel to a steering motor, the improvement comprising:

a. a lower pivot assembly pivotially affixed to the base support, said lower pivot assembly having a first lower telescoping shaft;

b. an upper pivot assembly having an upper shaft pivotially affixed to an upper sub-assembly, the upper sub-assembly affixed to the first lower telescoping shaft;

c. said input shaft located coaxially with the upper shaft, the upper sub-assembly, the lower pivot assembly and base support said input shaft affixed to the steering motor, said input shaft having an upper telescoping shaft, affixed to said upper telescoping shaft is the steering wheel;

d. a lower gas cylinder connecting the base support and the lower pivot assembly; and e. an upper gas cylinder connecting the upper sub-assembly and upper shaft, whereby the input shaft transmits a rotation force placed on the steering wheel to the steering motor and the steering column is able to translate on an axis defined by the upper telescoping shaft and also translate on an axis defined the first lower telescoping shaft, and the steering column is able to rotate about the lower pivot assembly by actuating the lower gas cylinder and rotate about the upper pivot assembly by actuating the upper gas cylinder.

19. The improvement described in claim 18, wherein the input shaft further comprises:

a. an inner input shaft pivotially connected to an upper input shaft by a first universal joint, the inner input shaft having an elongated key located on an exterior circumference;

b. an outer input shaft located coaxially to the inner input shaft, said outer input shaft also slideably connected to the inner input shaft, the outer input shaft having a key slot whereby the elongated key is inserted into the key slot located on an interior circumference; and c. a lower input shaft connected to the outer input shaft by a second universal joint, said lower input shaft connected to the steering motor.

20. The improvement described in claim 19, further comprising:

a. a non-flexible lower cover with a lower region and a first concave portion, said lower cover located coaxially with the first lower telescoping shaft, the lower cover affixed to a cover attachment mount, said lower region inserted within the flexible boot; and b. a non-flexible middle cover with an upper region and with a second concave portion said second concave portion partially surrounding the first concave portion, said middle cover located coaxially with the upper shaft, said upper region inserted within an upper cover.

* * * * *